July 6, 1926.
W. W. GIVEANS
STRIPPING FILM
Filed July 16, 1925
1,591,304
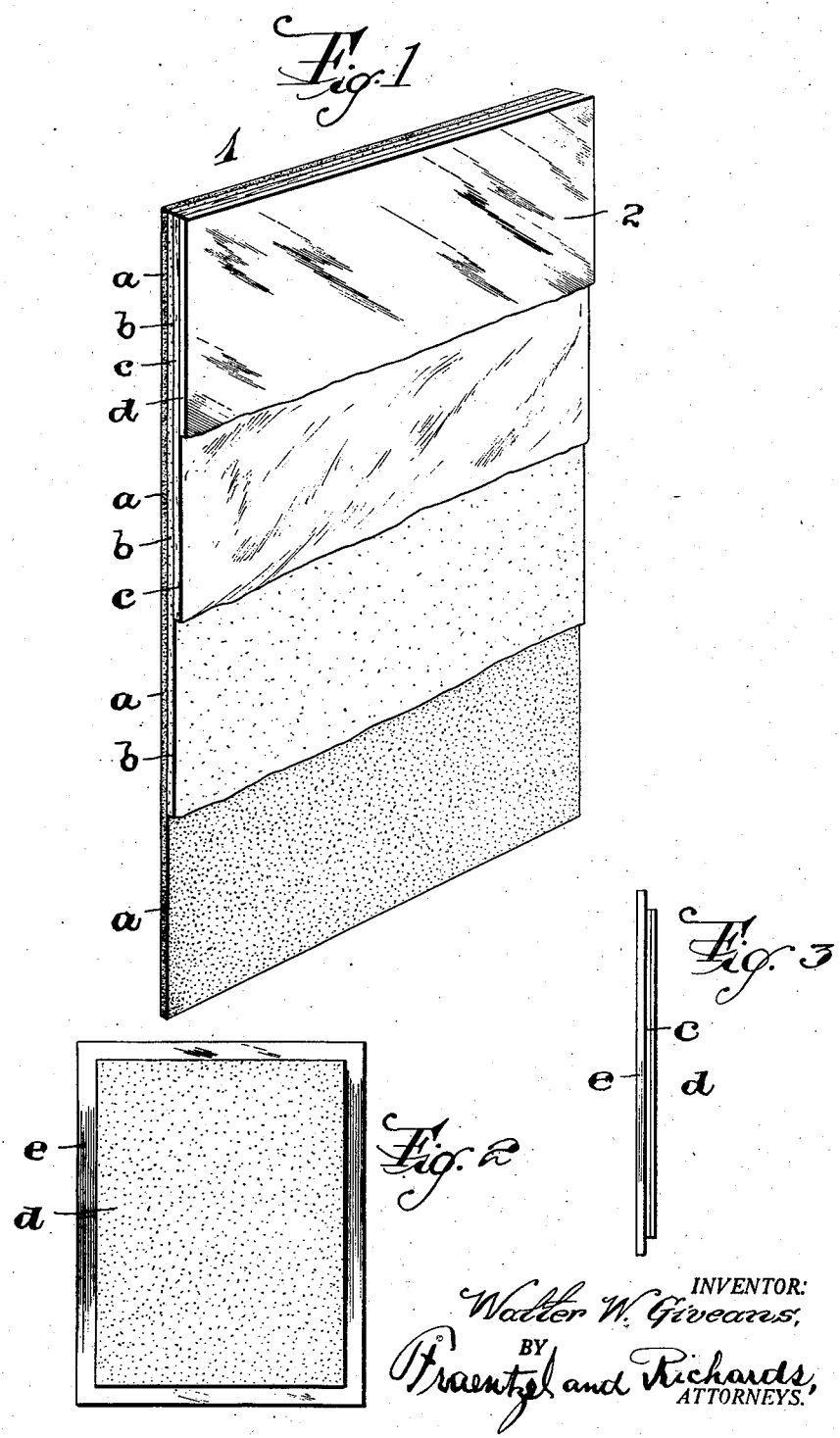

Patented July 6, 1926.

1,591,304

UNITED STATES PATENT OFFICE.

WALTER W. GIVEANS, OF NEWARK, NEW JERSEY.

STRIPPING FILMS.

Application filed July 16, 1925. Serial No. 43,949.

This invention has reference, generally, to the production of what is known in the art as stripping films, the film being disposed upon the surface of one medium and adapted to be transposed to the surface of another medium for use therewith in a manner to be hereinafter more fully set forth.

The present invention, therefore, has for its principal object, the production of a stripping film, adapted to be applied to the surface of another medium, such as a photographic plate, or the like, and for the purpose, more particularly, of vignetting to a feather-edge, difficult and customary photographic backgrounds; and, furthermore, for retouching, blocking out, modifying, and generally improving the working and printing quality of photographic negatives.

The present invention has for its further object to provide a novel stripping film adapted to be readily applied to the face or surface of glass to indicate ground glass; and, finally, to provide a convertible stripping film which is readily applicable to the various arts, crafts, sciences, and trades.

Other objects of the present invention not at this time more particularly enumerated will be fully understood from the following detailed description of the same.

With the various objects of the present invention in view, the invention consists, generally, in the production of a novel film or tissue adapted to be transmitted to a smooth and grainless surface to change such surface into a rough or a granular surface for use in the various arts and trades, and, more particularly to the preparation, by means of the film, of photographic negatives for vignetting, blending upon, blocking out, retouching, and doctoring purposes, and enabling improving and desirably altering exposed and developed negatives.

My present invention consists, furthermore, in the novel means, process, method, device, contrivance, and product of producing and procuring translucent films and tissues of various thicknesses, and of various degrees of roughness, the film or tissue being transferable from the rough or toothed surface of a base, as paper, to a smooth surface so as to transform such smooth surface into a rough surface.

Furthermore, the invention consists in the novel surfacing and vignetting film which consist of a scientifically and chemically treated film and surface-forming substances, to provide a film of various quality of grain or roughness, suitable for many and various requirements, to be readily applied to flat or curved, smooth or polished surfaces, such as glass, and other suitable materials, and when so applied the surface, as a base, being transformed into a translucent, non-reflective impaired, granular, rough, or toothed surface, whereby the originally smooth or polished surface is in a perfect condition to receive applications of anhydrous paints, chalk, doctoring and retouching mediums.

I have found in practice that this created surface can be harshly worked and blended upon, with a brush, pencil, stump, eraser, tip of the finger, etc., without losing its rough structural strength, so that fade away, feather-edges, wash backgrounds, and cloud-effects may be readily obtainable by the unskilled. With the present invention, the customary ground glass substitutes, and the air-brush and all other methods usually employed by photographers may be dispensed with. With respect to the desired details of a photographic negative when provided upon its back with a film made according to the principles of the present invention, all intermediate details upon the plane, between the edge of the negative and the center, are directly approachable for doctoring, shading, or the like, by means of the herein described vignetting film, the film offering a proper and suitable means for the purposes of modifying, altering, improving, changing, balancing, building up, reducing, and perfecting the exposed and developed negative to one's fancy.

It will be understood, that the degree of the film-medium may be varied, and that a converted film will appear translucent over its entire plane, and will remain so under all ordinary conditions. However, if a suitable varnish-like medium be applied for local increased light requirements, the place or part so treated will permit of a freer passage of actinic light, and hence, local intensified printing qualities will be obtained.

The invention is illustrated in the accompanying drawings which clearly illustrates one embodiment of the same.

In the said drawings, Figure 1 is a perspective view showing a fragmentary portion of a base, a volatile or hydrolytic dissolved parting medium applied thereon, an intermediate coating applied upon said parting medium, and a film-providing layer applied upon said intermediate medium.

Figure 2 is a face view of the rear or back of a photographic negative or other base, with the convertible film transferred to said back; and Figure 3 is a vertical sectional representation of the same.

Similar characters of reference are employed in the said above described views, to indicate corresponding parts.

Referring now more particularly to Figure 1 of the drawings, the reference-character a indicates a suitable temporary base, of a good quality of paper, or other suitable substance, the surface 1 of which is substantially rough, or of a serrated or toothed nature. The reference-character b indicates a suitable parting medium, formed of a suitable volatile or hydrolytic solution, or the equivalent thereof, c indicates a resinous or other hard, firm coating, which may be either rough or smooth, and is termed herein the intermediate coating, and d indicates the convertible film or tissue of cumar and gelatine, the reference-character 2 indicating the rough serrated or toothed surface of the same.

Briefly, the paper a is the temporary base, the wax b is the parting or separating element, cumar, indicated by c, gives hardness and strength to the rough or serrated surface of the to be transferred gelatine tissue or film, and d is the resultant cumar-faced gelatine tissue or film having the mentioned rough or toothed surface, which may receive upon said surface, applications of anhydrous paints, chalk, or other doctoring and retouching mediums, the created surface 2 being adapted to be harshly worked and blended upon with brush, pencil, stump, eraser, tip of the finger, or in any other manner, without destroying the rough structure and strength of the face of the film d.

Referring now to Figures 2 and 3 of the drawings, the reference-character e indicates the permanent base to which the cumar-faced tissue or film d has been transferred, in the manner to be presently described, the base or vehicle e being either a photographic negative, a plate of glass, or other suitable transparent or translucent or opaque body.

In the preparation of the convertible film, I prefer to take for the temporary base a, a good quality of rag stock, such as a rough or serrated paper, or other material suitable for the base, to one of the surfaces is applied, in any suitable manner, a solution consisting of 12 grains beeswax dissolved with the aid of heat in an ounce of carbon tetrachloride, the solution being allowed to cool to the temperature of the room, and being applied by the usual capillary surface-dipping, or other suitable coating method to one of the faces of the temporary base.

As soon as this coating b has dried, this coating b is provided with another coating c of cumar, which is a synthetic gum or resin produced from coal tar distillates, and which in appearance resembles ordinary resin (colophony), dissolved in pure benzole, in the proportion of 12 grains of cumar to one ounce of benzole. This cumar-benzole solution is next spread or coated upon the previously waxed face of the paper, or other temporary base a, and allowed to dry. I next take 72 grains of hard gelatine, place the same in a suitable receptacle, and add two ounces of water, so as to allow the gelatine to suitably swell, finally dissolving the gelatine in a water bath at 120 degrees Fahrenheit. When the gelatine is completely dissolved and cooled to about 90 degrees Fahrenheit, I proceed to coat the waxed cumar-coated base a with the gelatine. After the same has thoroughly dried, the article of manufacture is cut up into suitable sizes for future use in the manner to be presently set forth.

As a modification, the cumar-coating (second coating) may be entirely omitted, and a substitute of suitable resinous or hardening matter may be directly incorporated in the final gelatine coating.

In order to transfer the film, as hereinabove produced, the complete article is immersed in sufficient clean cold water, for about ten minutes, until the article swells and becomes thoroughly soaked. Thereupon the article is next removed and placed, face out, upon a suitable slanting base or support for proper drainage. After the article has been sufficiently drained, it is placed face down, upon either side of the negative e, or other suitable object, as may be desired, taking care to squeeze out all surplus water between the adjacent faces of the article and the permanent base or object to which it is applied. After careful drying, either by gentle heat, or otherwise, the temporary paper or other base a, may readily be removed by use of a knife-blade, or fingernail, at one corner, to slowly pull away the temporary paper or other base a, which is thereupon discarded, revealing the transferred film upon the permanent base d, which as has been stated, may be either side of a photographic negative, or any other object desired as a permanent base.

In lieu of the formula herein-above stated, I may employ the following combination, by means of which I produce practically the same or similar results.

A. Raw paper base. 12 grains beeswax, dissolved in 30 c.c. carbon tetrachloride, 8 grains cumar, dissolved in 30 c. c. benzole, 72 grains hard gelatine, dissolved in 45 c. c. water, to which is added, 6 grains sodium resinate, dissolved in 10 c. c. water, and then 2 grains citric acid, dissolved in 5 c. c. water is added to the above.

B. Raw paper base. 12 grains beeswax, dissolved in 30 c. c. carbon tetrachloride, 8 grains cumar, dissolved in 30 c. c. benzole, 72 grains hard gelatine, dissolved in 60 c. c. water.

C. Raw paper base. 12 grains beeswax, dissolved in 30 c. c. carbon tetrachloride, 72 grains hard gelatine, dissolved in 45 c. c. water, to which is added 6 grains sodium resinate, dissolved in 10 c. c. water, and then 2 grains citric acid, dissolved in 5 c. c. water is added to the above.

D. Raw paper base. 12 grains beeswax, dissolved in 30 c. c. carbon tetrachloride, 72 grains hard gelatine, dissolved in 60 c. c. water.

I am aware, also, that instead of the volatile solvent, carbon tetrachloride, I may substitute, acetylene tetrachloride.

From the foregoing description of the present invention, it will be seen, that I have produced a properly surfaced tissue film, which will afford a practical working surface for working up photographic negatives, but which is also practical for other uses in the various arts. The tissue films produced have a granular texture, with an innate quality of translucency that will reproduce a granular reflection, and hence a tissue film without deflective impairment is the result.

Furthermore, roughness of the base or bases will produce a mat-grain quality of the film, the structure-order being obtained by or with the degree of the texture of the primary and of the secondary base or bases. Hardness of grain of the working surface of the film is obtained by the hard or resinous middle coating, or by the hardened final film-coating, and thickness of the film is obtained by the hygroscopic and gravity density of the film-forming medium used and the speed of the coating operation.

Of course, I am aware that changes may be made in the arrangements and combinations of the various parts, without departing from the scope of the present invention as set forth in the foregoing specification. Hence, I do not limit my present invention to the exact arrangements and combinations of the various parts as described in the said specification, and as illustrated in the accompanying drawings.

I claim:—

1. The herein-described art of preparing surfaces which consists in applying a chemically treated film to such surface so as to transform the latter into a non-reflectively impaired translucent surface.

2. The herein-described art of preparing surfaces which consists in applying a chemically treated gelatine film to such surface so as to transform the latter into a non-reflectively impaired translucent surface.

3. The herein-described art of preparing surfaces which consists in applying a resin-treated film to such surface so as to transform the latter into a non-reflectively impaired translucent surface.

4. The herein-described art of preparing surfaces which consists in applying a resin-treated gelatine film to such surface so as to transform the latter into a non-reflectively impaired translucent surface.

5. The herein-described art of preparing surfaces which consists in applying a chemically treated film having a toothed or rough granular face to such surface so as to transform the latter into a non-reflectively impaired translucent surface.

6. The herein described art of preparing surfaces which consists in applying a chemically treated gelatine film having a toothed or rough granular face to such surface so as to transform the latter into a non-reflectively impaired translucent surface.

7. The herein-described art of preparing surfaces which consists in applying a resin-treated film having a toothed or rough granular face to such surface so as to transform the latter into a non-reflectively impaired translucent surface.

8. The herein-described art of preparing surfaces which consists in applying a resin-treated gelatine film having a toothed or rough granular face to such surface so as to transform the latter into a non-reflectively impaired translucent surface.

9. As a new article of manufacture, means for producing mat-surface effects, comprising a temporary base, associated with a mat-surface producing film removable from said base.

10. As a new article of manufacture, means for producing mat-surface effects, comprising a temporary base, said base having a toothed or rough granular face associated with a mat-surface producing film removable from said base.

11. As a new article of manufacture, means for producing mat-surface effects, comprising a temporary base, associated with a mat-surface producing gelatine film removable from said base.

12. As a new article of manufacture, means for producing mat-surface effects, comprising a temporary base, said base having a toothed or rough granular face, associated with a mat-surface producing gelatine film removable from said base.

13. As a new article of manufacture, means for producing mat-surface effects, comprising a temporary base, associated with a resin-treated mat-producing film removable from said base.

14. As a new article of manufacture, means for producing mat-surface effects, comprising a temporary base, said base having a toothed or rough granular face, associated with a resin-treated mat-producing film removable from said base.

15. As a new article of manufacture, means for producing mat-surface effects, comprising a temporary base, associated with a resin-treated mat-surface producing gelatine film removable from said base.

16. As a new article of manufacture, means for producing mat-surface effects, comprising a temporary base, said base having a toothed or rough granular face, associated with a resin-treated mat-surface producing gelatine film removable from said base.

17. A surface tissue film for photographic negatives and other objects having a granular texture and an innate quality of translucency to produce a film-tissue without reflective impairment.

18. A surface tissue film for photographic negatives and other objects having a granular texture and an innate quality of translucency to produce a film-tissue without reflective impairment, said film having a hard resin-treated working surface.

19. A gelatine surface tissue film for photographic negatives and other objects having a granular texture and an innate quality of translucency to produce a film-tissue without reflective impairment.

20. A gelatine surface tissue film for photographic negatives and other objects having a granular texture and an innate quality of translucency to produce a film-tissue without reflective impairment, said film having a hard resin-treated working surface.

In testimony that I claim the invention set forth above I have hereunto set my hand this 14 day of July, 1925.

WALTER W. GIVEANS.